Aug. 4, 1959      H. B. BARRETT      2,897,882
TIRE TREAD SURFACING MACHINE

Filed June 8, 1956      5 Sheets-Sheet 1

INVENTOR.
HARRY B. BARRETT
BY
ATTY.

Aug. 4, 1959  H. B. BARRETT  2,897,882
TIRE TREAD SURFACING MACHINE
Filed June 8, 1956  5 Sheets-Sheet 2

INVENTOR.
HARRY B. BARRETT
BY
ATTY.

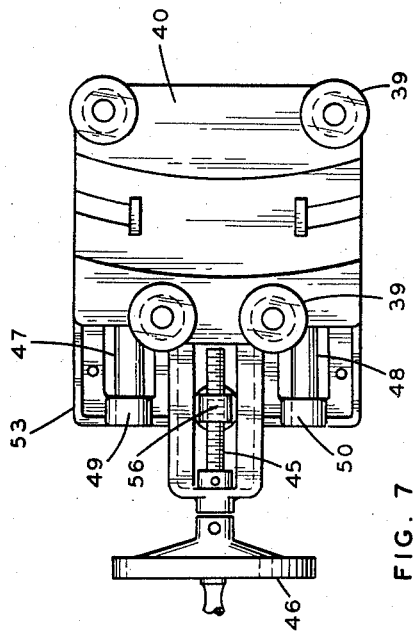
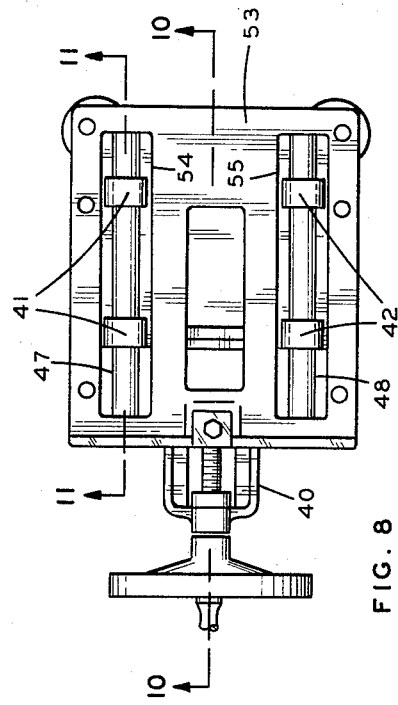
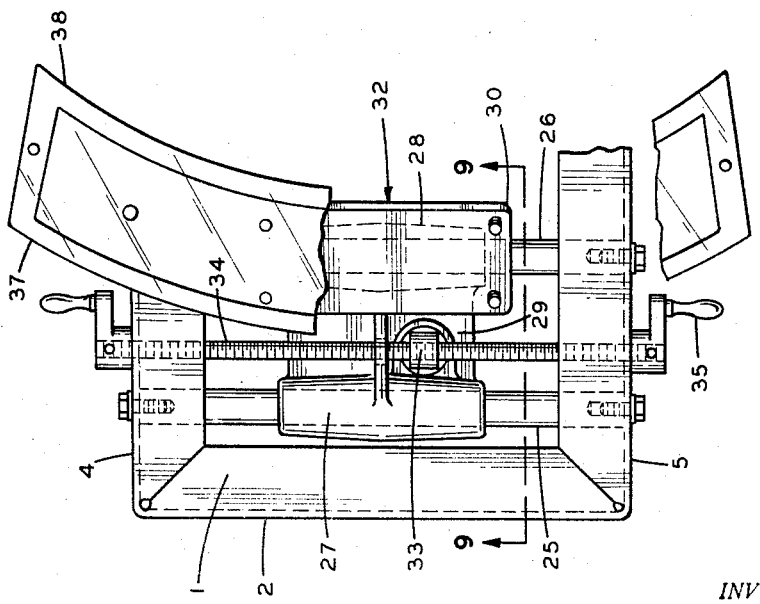

Aug. 4, 1959

H. B. BARRETT 2,897,882

TIRE TREAD SURFACING MACHINE

Filed June 8, 1956

INVENTOR.
HARRY B. BARRETT
BY
ATTY.

Aug. 4, 1959 H. B. BARRETT 2,897,882
TIRE TREAD SURFACING MACHINE
Filed June 8, 1956 5 Sheets-Sheet 5

INVENTOR.
HARRY B. BARRETT
BY
ATTY.

United States Patent Office 2,897,882
Patented Aug. 4, 1959

2,897,882

TIRE TREAD SURFACING MACHINE

Harry B. Barrett, Clayton, Mo.

Application June 8, 1956, Serial No. 590,285

4 Claims. (Cl. 157—13)

This invention relates in general to certain new and useful improvements in tire tread surfacing machines and, more particularly, to a tire truing machine adapted to form an accurately concentric and properly crowned surface on the tire tread.

It has recently been discovered as a result of extensive tests by automotive engineers that a great deal of the vibration and roughness which is felt by the passengers in modern automobiles, particularly at high speeds, is the result of non-concentricity in the tires. In fact, many times the wheels are thought to be out-of-balance and are subjected to expensive wheel balancing treatment when actually the tires are not truly concentric with the wheel axle and are, thereof, "out-of-round," as the condition is sometimes called. This situation and its significance can best be illustrated by reference to a tire, which, for example, may be only ¼ inch out-of-round. This, of course, means that across some particular diametral line the radius on one side is ¼ inch longer than the radius on the other and, consequently, the wheel axle will be bumped up and down through an amplitude of ¼ inch each time the wheel completes a revolution. At a speed of sixty miles per hour, this up-and-down bumping action will occur seven hundred twenty times each minute, resulting in an uncomfortable ride, as well as rapid wear and tear on the entire automobile and particularly upon the shock absorbers and steering gears.

A somewhat related condition of excessive tire wear and riding discomfort also results when the tread-face does not have the proper transverse arcuate contour or so-called "crown." If the crown is too flat or excessively curved, the tire wears irregularly and too rapidly, which, in turn, frequently results in an out-of-round condition. Consequently, the life of the tires can be actually prolonged by the apparently paradoxical procedure of removing a portion of the tread-face to render the tire truly concentric and properly crowned.

It is, therefore, the primary object of the present invention to provide a tire-truing machine which is capable of forming a truly concentric and properly crowned surface upon the tread-face of vehicular tires.

It is another object of the present invention to provide a compact, highly efficient tire truing machine which can be used while the wheel and tire are operatively mounted on the vehicle, thereby obviating the necessity for removing the tire and wheel assembly from the axle.

It is also an object of the present invention to provide a tire truing machine which is relatively simple in operation and can be efficiently used by ordinary mechanics without any highly specialized skill or training.

It is an additional object of the present invention to provide a tire truing machine which is capable of being quickly adapted for various types of tire truing operations with the wheel-and-tire assembly either on the car or off the car.

With the above and other objects in view, my invention resides in the novel features of form, construction, arrangement, and combination of parts presently described and pointed out in the claims.

In the accompanying drawings—

Figure 9:
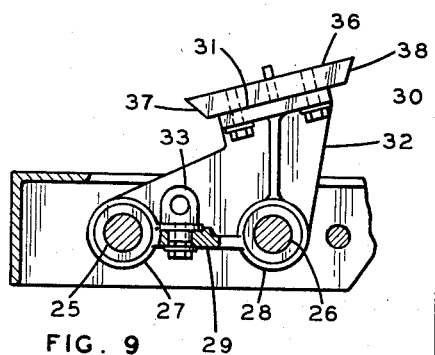
Figure 11:
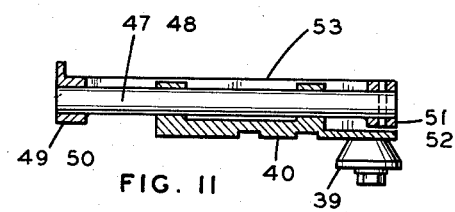
Figure 10:
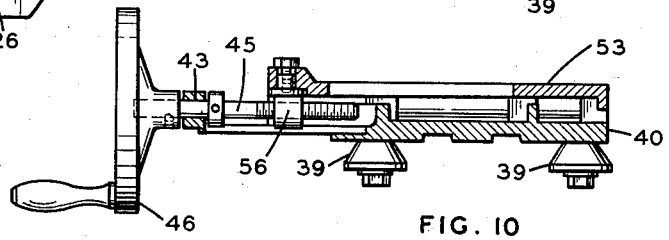
Figure 5:
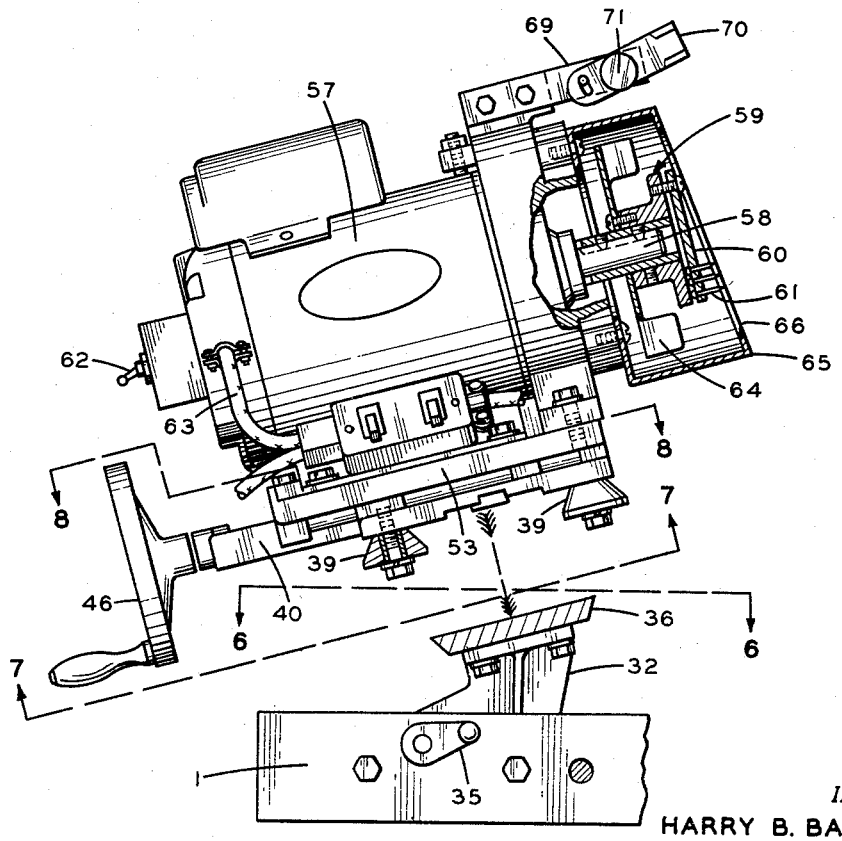
Fig. 5 is a fragmentary sectional view taken along line 5—5 of Fig. 3.
Figure 12:
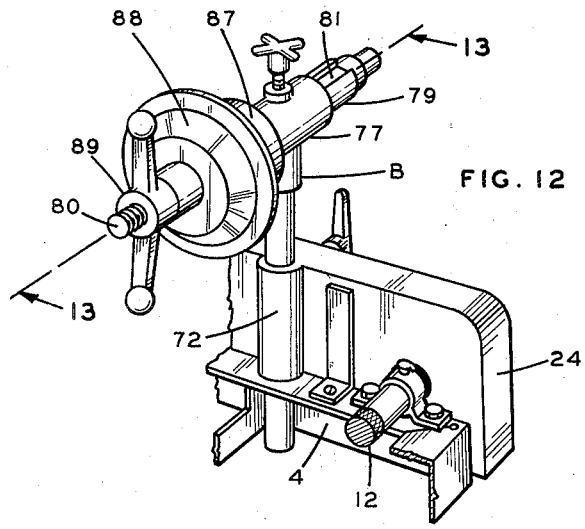
Figure 13:
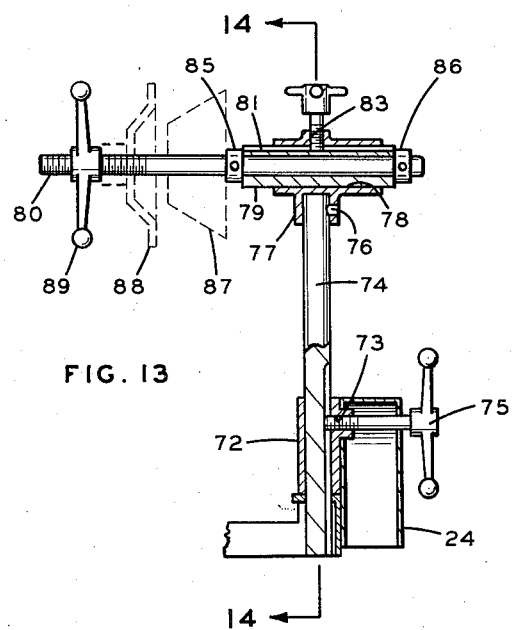

Figs. 6, 7, and 8 are fragmentary sectional views taken along lines 6—6, 7—7, and 8—8, respectively, of Fig. 5;

Fig. 9 is a fragmentary sectional view taken along line 9—9 of Fig. 6;

Figs. 10 and 11 are fragmentary sectional views taken along lines 10—10 and 11—11, respectively, of Fig. 8;

Fig. 12 is a fragmentary perspective view of the tire truing machine with an optional adapter spindle in operative position thereon for supporting a tire-and-wheel assembly which has been removed from the axle;

Fig. 13 is a fragmentary sectional view taken along line 13—13 of Fig. 12; and

Figure 14:
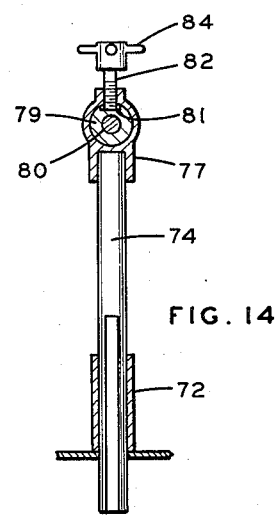

Fig. 14 is a fragmentary sectional view taken along line 14—14 of Fig. 13.

Referring now in more detail and by reference characters to the drawings, which illustrate a practical embodiment of the present invention, A designates a tire truing machine comprising a rectangular base-frame 1 formed by parallel front and rear walls 2, 3, and parallel side walls 4, 5. Mounted at its opposite ends in, and extending horizontally between, the side walls 4, 5, adjacent to the front wall 2, is an axle 6 rotatably supporting two wheels 7, 8, which are respectively positioned just outside the outer faces of the side walls 4, 5, and project downwardly below the frame 1 for rolling engagement with the floor. Bolted or otherwise suitably mounted centrally upon the rear wall 3 is a freely swiveling caster 9 having a depending wheel 10 which likewise projects below the frame 1 for rolling engagement with the floor. Rockably mounted at its ends upon the side walls 4, 5, adjacent the rear wall 3 is a U-shaped handle 11 by which the tire truing machine A can be pulled around into various work-locations in the garage or repair station where it is being used.

Journaled in and extending horizontally between the side walls 4, 5, toward the rear of the frame 1 are two spaced parallel shafts 12, 13, each of which is also parallel to the front and rear walls 2, 3, and is provided, for a substantial portion of its length, with a knurled surface for tractive engagement with the tread-face of a tire, for purposes presently more fully appearing. The shaft 13 is actually an idler shaft, whereas the shaft 12 projects through the side wall 4 and on its projecting end is provided with a pulley 14, which is, in turn, connected by a belt 15 to a speed-reducing dual pulley 16 operatively mounted on an idler shaft 17 and connected by a belt 18 to a drive pulley 19 pinned or otherwise fixed upon the drive shaft 20 of an electric motor 21 which is suitably mounted in the frame 1 and is conventionally connected through a switch 22 and flexible two-wire conductor cord 23 to a source of electrical power (not shown). The pulleys 14, 16, 19, and belts 15, 18, are protectively enclosed in a sheet metal cover or housing 24 removably bolted on the outer face of the side wall 4.

Rigidly mounted at their opposite ends in and extending lengthwise between the side walls 4, 5, toward the front portion of the frame 1, are two laterally spaced horizontal slide-rods 25, 26, which are also parallel to each other and to the front wall 2. Slidably mounted on the slide-rods 25, 26, for lengthwise shifting movement between the side walls 4, 5, are sleeves 27, 28, respectively, which are integrally cross-connected by a web 29 having an upwardly projecting enlarged flange 30 machined across the top in the provision of a flat horizontal mounting face 31, thus forming a transversely shiftable carriage 32. The web 29 is also integrally provided with a depending internally threaded nut 33 located preferably midway between the slide-rods 25, 26, and operatively engaged with a horizontal lead screw 34 journaled at its ends in and extending lengthwise between the side walls 4, 5, parallel to the slide-rods 25, 26. At one of its ends, the lead screw 34 projects through the side wall 5 and is provided with a hand-wheel 35 which can be manually rotated, causing the nut 33 and the carriage 32 associated therewith to shift transversely with respect to the frame 1. It should be noted in this connection that the pitch of the lead screw 34 is such that the carriage 32 will be firmly held in any transversely shifted position.

Figure 1:
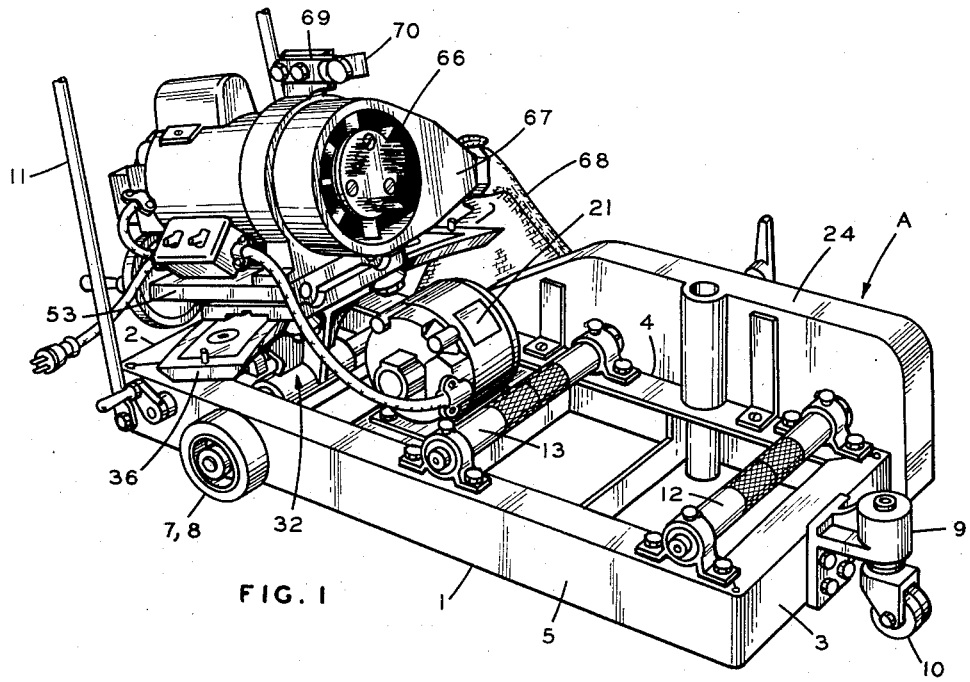
Fig. 1 is a perspective view of a tire truing machine constructed in accordance with and embodying my present invention.
Figure 2:
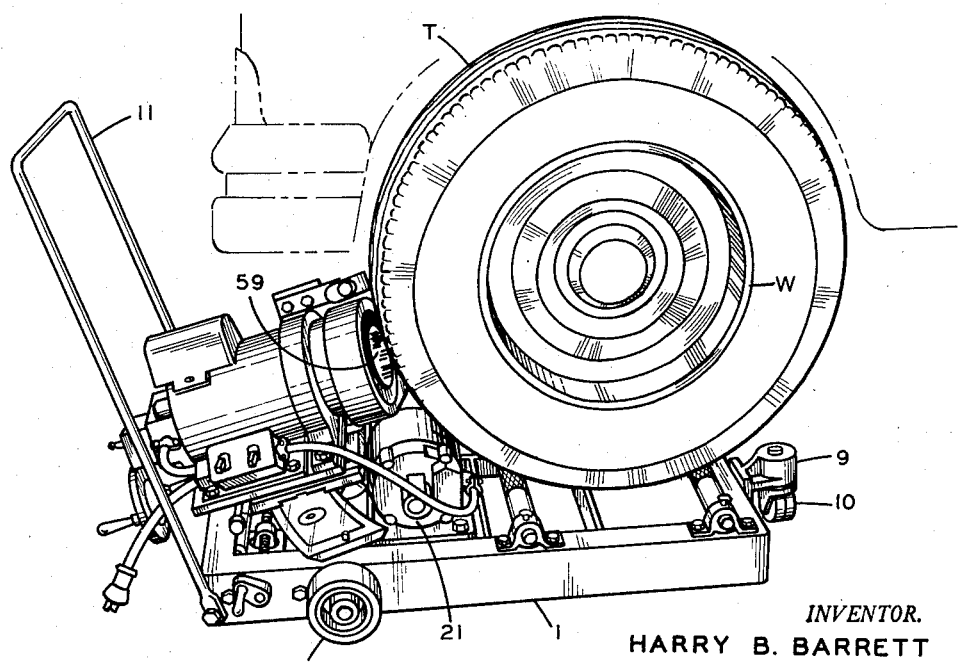
Fig. 2 is a perspective view of the tire truing machine showing a vehicle tire in operative position thereon.
Figure 3:
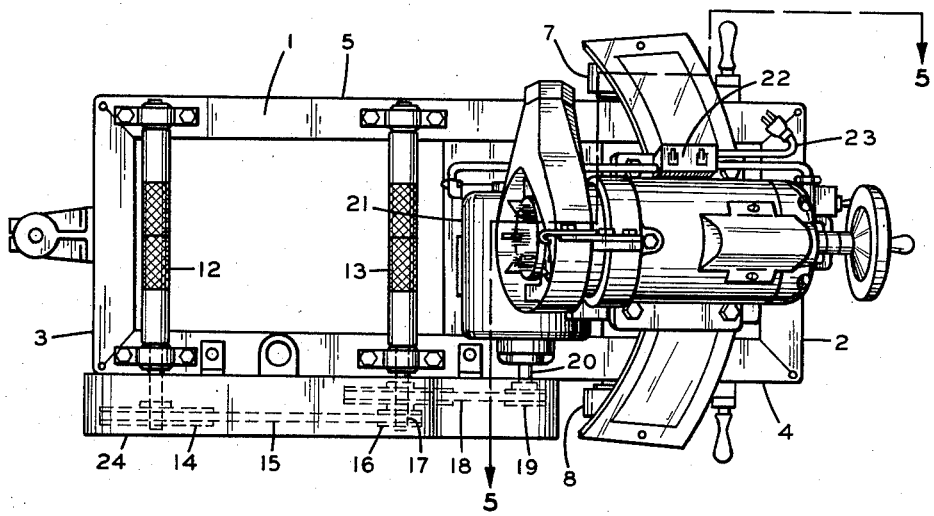
Fig. 3 is a top plan view of the tire truing machine.
Figure 4:
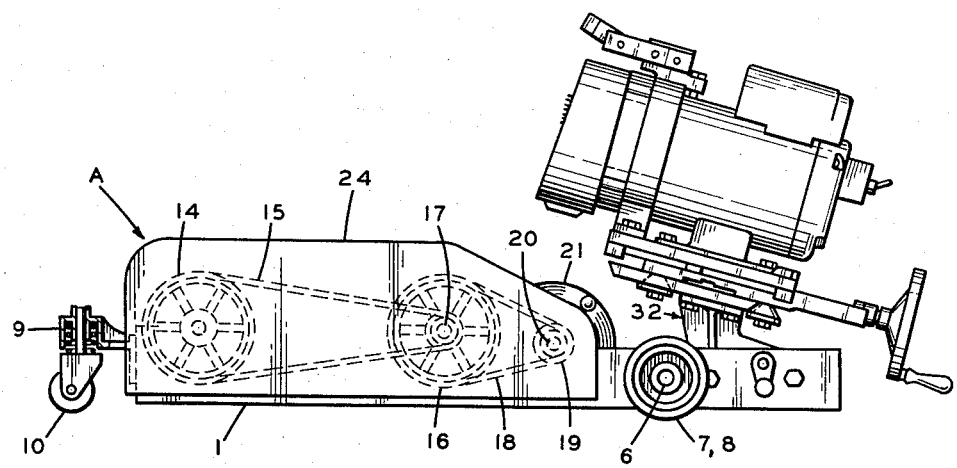
Fig. 4 is a side elevational view of the tire truing machine.

Bolted or otherwise securely fastened to the mounting face 31 and thus forming a part of the carriage 32 is a flat plate 36 having beveled arcuate margins 37, 38, which are precisely machined to concentric arcs conforming to the cross-sectional contour of a tire tread-face and the common center thereof lies along the transverse center line of the carriage 32, that is to say, the center line which is parallel to the longitudinal axis of the frame 1. Since the carriage 32 can be shifted transversely with respect to the frame 1, it is thus possible to position the carriage so that this center line will lie in the vertical plane of symmetry of the tire which is being surfaced, such as the tire T in Fig. 2. This adjustment is necessary because tires vary in dimension and may be variously located on the frame 1, as will more fully appear hereinafter.

Shiftably mounted upon the plate 36 by means of four frusto-conical rollers 39 is a rectangular slide plate 40 provided upon its lateral edges with upstanding guide sleeves 41, 42. Rotatably mounted in and extending through journals 43, 44, midway between the guide sleeves 41, 42, is an auxiliary lead screw 45 which projects forwardly beyond the slide plate 40 and is provided with a hand-wheel 46. Shiftably mounted in the guide sleeves 41, 42, and extending lengthwise therethrough are slide rods 47, 48, which are rigidly pinned or otherwise suitably fastened at their ends, respectively, in depending bosses 49, 50, and 51, 52, which are integrally formed on a motor supporting slide 53 having parallel clearance slots 54, 55, along its opposite side margins for allowing the guide sleeves 41, 42, to project upwardly therethrough and thus affording a compact construction having minimum vertical height. Bolted on the under face of the motor supporting slide 53 is a nut 56 threadedly engaged with the lead screw 45 whereby the motor-supporting plate can be fed upwardly toward the tire T.

Rigidly bolted upon the motor-supporting slide 53 is an electric motor 57 having its drive shaft 58 presented toward the tire T and securely fastened to the drive shaft 58 is a cutting head 59 consisting of a disk 60 having a plurality of sharp-pointed pins 61 fixed therein and adapted, upon rapid rotation, to take a fine-grained cut across the tread-face of the tire T. The motor 57 is conventionally connected by means of a switch 62 and two-wire conductor cord 63 to a source of electric power (not shown). Formed integrally upon the interior face of the cutting head 59 are fan blades 64. Affixed to the motor supporting slide 53 immediately in front of the motor 57, and encircling the drive shaft 58 is a guard housing 65 which is primarily circular in shape and extends enclosingly around the cutting head 59. The guard housing 65 is also provided with an outwardly presented round opening 66 through which the pins 61 project, and extending laterally from one side thereof is a funnel-like adapter 67 to which cloth or paper bag 68 may be affixed. Adjustably fastened to the top of the guard housing 65 is a bar 69 adapted to hold a tire-grooving knife 70 which can be shifted in or out of contact with the tire by pivoting the knife 70 around a screw 71, which further functions to secure the knife 70 once it is put in the desired position relative to the tire T.

In use, the automobile is driven or otherwise suitably positioned on the frame 1 so that one of the front tires T rests upon the rollers 12, 13. The motor 21 is then turned on and the tire T caused to rotate while a piece of chalk or similar marking material is applied to the tread. Thereupon, the carriage 32 is adjusted laterally so that when the motor-supporting slide 53 is in centered position with relation to the plate 36, the axis of rotation of the cutting head 59 will be exactly coincident with the center plane of the tire T. The cutting head 59 is then positioned on one edge of the tire by manual movement of the slide plate 40 along the plate 36. The motor 57 is turned on and the hand-wheel is then turned to shift the motor-supporting slide 53 and all of its supported mechanism inwardly until the ends of the pins 61 just barely contact the surface of the tire T. The pins 61 have a rasp-like action and remove a fine-grained thin cut from the tire T until all the chalk in the path of the cut has been just barely removed. The motor slide 53 is then backed off and manually moved along the plate 40 to take off another adjacent cut. This procedure is followed until the operator has succeeded in covering the tire surface from one edge to the other by means of removing small adjacent strips of tire surface. The tire T will be completely concentric when all the chalk marks have been removed from the tire surface. When one tire T has been completed, the other front tire may be surfaced in the same manner.

Where it is desirable or necessary to demount the tire and wheel assembly and surface a tire off the wheel, so to speak, a removable wheel arbor assembly B, as shown in Figs. 12, 13, and 14, may be provided. For this purpose, a vertical sleeve 72 is spot-welded or otherwise securely fixed to the inner face of the side wall 4 between the rollers 12, 13, and is provided near its top with a threaded aperture 73 facing toward the housing 24. Removably seated in the sleeve 72 is a vertical post 74 secured therein by means of a set screw 75 which is mounted in the threaded aperture 73. Rigidly mounted on the top of the post 74 by means of a set screw 76 is a T-fitting 77 having a horizontal bore 78 through which a sleeve 79 is slidably mounted. Journaled in and extending through the sleeve 79 is an arbor 80 which extends horizontally across the frame 1 parallel to the front wall 2. The sleeve 79 is milled off on its upper face, providing a flat surface 81 for engagement with a set screw 82 which extends through a threaded aperture 83 in the top of the T-fitting 77, said set screw 82 having a handle 84 rigidly mounted on its upper end so that the set screw 82 can readily be tightened against the flat surface 81 of the sleeve 79, thus preventing any transverse or rotatable motion of the sleeve 79. Outwardly along the arbor 80 on opposite sides of the sleeve 79 are set collars 85, 86, for holding the arbor 80 in any desired position of lengthwise adjustment in relation to the sleeve 79.

Mounted on the inner end of the arbor 80 is a circular adapter plate 87, said plate 87 being shaped to conform to the inner hub surface of an ordinary wheel W and support same upon the arbor 80. Also mounted on the arbor 80 is a clamping plate 88 which can be firmly engaged against one face of the wheel hub by a lock nut 89 threadedly mounted on the inner end of the arbor 80. Thus, by manipulation of the set collars 85, 86, and by tightening of the lock nut 89, the arbor 80 and tire T can be operatively mounted on the rollers 12, 13. It, of course, should be understood that different front hub fitting adapter plates 87 may be employed depending on the size and type of wheel W which is to be mounted.

It should be understood that changes and modifications in the form, construction, arrangement, and combination of the several parts of the tire truing machine may be made and substituted for those herein shown and described without departing from the nature and principle of my invention.

Having thus described my invention, what I claim and desire to secure by Letters Patent is:

1. A tire tread-face conditioning machine for correcting non-concentricity of the tread-face of an automobile tire, said machine comprising a base-frame, driving means operatively mounted on the base-frame for rotating the tire about its axis of rotation, tread-facing means operatively mounted on the base-frame for disposition against the tread-face of the tire, said tread-facing means being adapted for removing a portion of the tread-face as the tire is rotated, a sleeve mounted on said base-frame, a vertical post telescopically mounted within said sleeve, a horizontally extending second sleeve mounted on the upper end of said vertical post, an arbor adjustably mounted within said second sleeve for optionally supporting the tire-and-wheel assembly on the frame in operative contact with said driving means when said tire-and-wheel assembly is removed from the automobile, and means for holding said arbor in any desired position of lengthwise adjustment in relation to said second sleeve.

2. A tire-tread facing machine comprising a base-frame adapted for movement over garage floors and similar supporting surfaces, a pair of spaced parallel rollers mounted in and extending horizontally across the frame to underlie a pneumatic tire which rests thereon in upright position, means for rotating the rollers in unison and thereby turning the tire, an arcuate plate mounted on said frame and being provided with opposed conical margins, a slide shiftably mounted on said plate and being provided with depending conical rollers movable along conical margins, an auxiliary slide operatively mounted on said slide, threaded means rotatable in said slide and threadedly engaged in said auxiliary slide for shifting said auxiliary slide toward and away from said tire along a path radially of said conical margins, means for shifting said plate, slide, and auxiliary slide in unison along a path parallel to said rollers, and means mounted on said auxiliary slide for disposition against the tread-face of the tire to remove a portion of the surface thereof as a tire is rotated.

3. A tire-tread truing machine for correcting non-concentricity of the tread-face of an automobile tire, said machine comprising a base-frame, means operatively mounted on the base-frame for rotating the tire about its axis of rotation, a carriage operatively mounted on the frame for transverse shifting movement, an inclined plate mounted on the carriage and being provided with opposed conical margins, a slide shiftably mounted on the plate and being provided with depending rollers having conical surfaces which are engageable with and match the conical margins on said plate, an auxiliary slide operatively mounted on said slide means for shifting said auxiliary slide toward and away from the tire, and tread-facing means operatively mounted on the auxiliary slide for disposition against the tread-face of the tire, said tread-facing means being adapted for removing a portion of the tread-face as the tire is rotated.

4. A tire tread-face conditioning machine for correcting non-concentricity of the tread-face of an automobile tire, said machine comprising a base-frame, driving means operatively mounted on the base-frame for rotating the tire about its axis of rotation, tread-facing means operatively mounted on the base-frame for disposition against the tread-face of the tire, said tread-facing means being adapted for removing a portion of the tread-face as the tire is rotated, a sleeve mounted on said base-frame, a vertical post telescopically mounted within said sleeve, a horizontally extending second sleeve mounted on the upper end of said vertical post, an arbor adjustably mounted within said second sleeve for optionally supporting the tire-and-wheel assembly on the frame in operative contact with said driving means when said tire-and-wheel assembly is removed from the automobile, and a plurality of adjustable collars, one mounted on said arbor adjacent each end of said second sleeve for holding said arbor in any desired position of lengthwise adjustment in relation to said second sleeve.

References Cited in the file of this patent

UNITED STATES PATENTS

| | | |
|---|---|---|
| 1,653,104 | Kimmerling | Dec. 20, 1927 |
| 1,713,248 | Zimarik | May 14, 1929 |
| 1,891,789 | Wheeler | Dec. 20, 1932 |
| 2,009,524 | Schmidt | July 30, 1935 |
| 2,027,490 | Pendelton | Jan. 14, 1936 |
| 2,034,662 | McLaughlin et al. | Mar. 17, 1936 |
| 2,085,650 | Godfrey | June 29, 1937 |
| 2,149,010 | Errig | Feb. 28, 1939 |
| 2,200,575 | Haskins | May 14, 1940 |
| 2,294,047 | Pollock | Aug. 25, 1942 |
| 2,623,591 | Furnald | Dec. 30, 1952 |
| 2,651,893 | Braley | Sept. 15, 1953 |
| 2,717,640 | Schnoebelen | Sept. 13, 1955 |
| 2,751,979 | Holland | June 26, 1956 |
| 2,765,845 | Bullis | Oct. 9, 1956 |